US011228216B2

(12) United States Patent
Leonardi et al.

(10) Patent No.: US 11,228,216 B2
(45) Date of Patent: Jan. 18, 2022

(54) STATOR FOR ELECTRIC MACHINE WITH CONDUCTORS WITH VARYING CROSS-SECTIONAL SHAPES

(71) Applicant: Ford Global Technologies, LLC, Dearborn, MI (US)

(72) Inventors: Franco Leonardi, Dearborn Heights, MI (US); Becky Sue Morris, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 117 days.

(21) Appl. No.: 16/685,029

(22) Filed: Nov. 15, 2019

(65) Prior Publication Data
US 2021/0152043 A1    May 20, 2021

(51) Int. Cl.
*H02K 3/14* (2006.01)
*H02K 3/26* (2006.01)
(Continued)

(52) U.S. Cl.
CPC ............... *H02K 3/14* (2013.01); *H02K 1/16* (2013.01); *H02K 3/26* (2013.01); *H02K 1/165* (2013.01);
(Continued)

(58) Field of Classification Search
CPC ............ H02K 1/16; H02K 1/165; H02K 1/18; H02K 1/185; H02K 1/278; H02K 3/14;
(Continued)

(56) References Cited

U.S. PATENT DOCUMENTS 6,856,063 B1    2/2005 Kelecy et al.
6,943,477 B1 *  9/2005 Nakamura ............... H02K 3/28
                                                310/180
(Continued)

OTHER PUBLICATIONS

Luigi Marino, KTH Royal Institute of Technology Electrical Engineering, Design and Analysis of a Fractional-Slot Concentrated-Wound PM-Assisted Reluctance Motor, Degree Project, in Electric Power Engineering, Second Level, Stockholm, Sweden 2015.
(Continued)

*Primary Examiner* — Tulsidas G Patel
*Assistant Examiner* — Rashad H Johnson
(74) *Attorney, Agent, or Firm* — David B. Kelley; Brooks Kushman P.C.

(57) ABSTRACT

A stator for an electric machine is formed in stratified layer forming a core having axial slots, and a plurality of hurdle-shaped conductors. Each conductor includes first and second uprights disposed in the slots, and a bridge connecting the uprights and extending circumferentially over a core end surface. The first upright is radially closer to a core central axis than the second upright. Each bridge steps radially outward from the first upright to the second upright. Radially adjacent bridges nest next to one another without crossing over one another. A junction between the first end of the bridge and the first upright defines a radially outward-facing ledge, and a junction between the second end and the second upright defines a radially inward-facing ledge. Each bridge passes over the outward-facing ledge of its radially inwardly adjacent conductor and passing over the inward-facing ledge of its radially outward adjacent conductor.

16 Claims, 6 Drawing Sheets

(51) Int. Cl.
  *H02K 1/16* (2006.01)
  *H02K 3/50* (2006.01)
  *H02K 21/24* (2006.01)
  *H02K 1/18* (2006.01)
(52) U.S. Cl.
  CPC ............... *H02K 1/18* (2013.01); *H02K 1/185* (2013.01); *H02K 3/50* (2013.01); *H02K 21/24* (2013.01)
(58) Field of Classification Search
  CPC ............ H02K 3/26; H02K 3/50; H02K 21/14; H02K 2203/06
  USPC ......................................................... 310/179
  See application file for complete search history.

(56) References Cited

U.S. PATENT DOCUMENTS

| | | | |
|---|---|---|---|
| 9,379,585 B2 * | 6/2016 | Marvin | H02K 3/24 |
| 9,748,804 B2 | 8/2017 | Klassen | |
| 10,770,953 B2 * | 9/2020 | Marvin | H02K 9/19 |
| 2011/0095639 A1 * | 4/2011 | Nakamura | H02K 15/026 310/207 |
| 2012/0007460 A1 * | 1/2012 | Kitamura | H02K 15/045 310/195 |
| 2015/0076951 A1 | 3/2015 | Lynch et al. | |
| 2016/0013692 A1 | 1/2016 | Wawrzyniak et al. | |
| 2018/0062457 A1 | 3/2018 | Gieras | |
| 2018/0205285 A1 | 7/2018 | Huang et al. | |

OTHER PUBLICATIONS

Olivier Barre and Bellemain Napame, Machines ISSN 2075-1702, Fractional Slot Concentrated Windings: A New Method to Manage the Mutual Inductance between Phases in Three-Phase Electrical Machines and Multi-Star Electrical Machines, Received: Apr. 8, 2015/Accepted: May 24, 2015/Published: Jun. 10, 2015.

* cited by examiner

STATOR FOR ELECTRIC MACHINE WITH CONDUCTORS WITH VARYING CROSS-SECTIONAL SHAPES

TECHNICAL FIELD

This disclosure relates to the field of electric machines. More particularly, the disclosure pertains to a stator for such a motor wherein the windings vary in cross-section in a manner that reduces end-turn length.

BACKGROUND

Electric machines (motors, generators, etc.) are comprised of several fundamental components that are common to many different types of machines: one or more current carrying components (the conductors or winding); a magnetic path component (the core); and a magnetic field source (either a coil or a magnet). In typical motors, including those currently employed in most electric vehicles, the stator includes windings comprising a plurality of straight portions extending axially through the core (usually passing through slots defined by the core), and a plurality of portions outside of and at each axial end of the core, generally referred to as end-turns. The end-turns electrically connect the axially oriented conductors inside slots defined by the core thereby completing the electrical circuit and creating the desired/required number of electric phases. Although necessary for the correct functioning of the machine, the end-turn region contributes to electrical losses, weight, cost, and volume but not to torque. It is therefore desirable to reduce the length and electrical resistance of the end-turns.

It is conventionally known to manufacture the stator of an EM by inserting U-shaped "hairpin conductors" into axially-extending slots formed in the stator from a first axial end of the stator and subsequently inter-connecting the ends of the hairpins projecting from the opposite second axial end of the stator as necessary to achieve the desired circuit path. Each hairpin conductor is conventionally fabricated by bending a copper rod or bar with rectangular cross section. As a result, the shape and area of the conductor cross section remains the same throughout the machine. The end-turns must cross axially over one another at both ends of the stator, and this adds to the overall length of the windings. The end-turns may therefore comprise a significant portion of the total winding length that in short stack machines (defined as machines where the radius is much larger that the axial length) can reach 50% of the total copper content.

Configurations have been suggested that allow electrical machine components to be produced by additive manufacturing, also commonly known as three-dimensional (3D) printing. None of the proposed configurations, however, have enabled the manufacture of a distributed winding stator in which the end-turns do not cross axially over one another. Eliminating such cross-overs would result in a significantly improved machine.

SUMMARY OF THE DISCLOSURE

In a first disclosed embodiment of a stator for an electric machine, stratified layers are arranged to form a core defining a plurality of slots extending parallel to a central axis of the core and separated by teeth, and a plurality of hurdle-shaped conductors. Each of the hurdle-shaped conductors comprises first and second uprights disposed in a different one of the slots, and further comprises a bridge connecting the uprights and extending circumferentially over an end surface of the core. The first upright is radially closer to the central axis than the second upright and each of the bridges steps radially outward from the first upright to the second upright. Radially adjacent bridges nest next to one another without crossing over one another.

In a further feature of the first embodiment, a first end of a bridge is connected with a radially inner portion of the respective first upright to define a radially outward-facing ledge at a junction between the first end and the first upright, and an opposite second end of the bridge is connected with a radially outer portion of the respective second upright to define a radially inward-facing ledge at a junction between the second end and the second upright. The bridge of a second of the conductors located radially outward of the first conductor passes over the outward-facing ledge; and the bridge of a third of the conductors disposed radially inward of the first bridge passes over the inward-facing ledge. This allows a very compact and efficient layout of the end-turns, and may be fabricated by an additive manufacturing process.

The inward-facing and outward-facing ledges may be slanted with respect to a plane of the core end surface to provide a gradual change in cross-sectional area where the bridge meets the respective ledge.

The first and second uprights may be equal in cross-sectional area, and a cross-sectional area of the bridge is nowhere less than the cross-sectional area of the first and second uprights.

In second embodiment disclosed herein, a section of one of the bridges passing over an intermediate slot between the slots containing the uprights is radially thinner than a section of the bridge passing over a tooth immediately adjacent to the intermediate slot.

In a third embodiment of a stator disclosed herein, the stratified layers of the stator are further arranged to form a plurality of hurdle-shaped outer conductors each comprising a third upright disposed in a third slot adjacent to the slot containing the first upright, a fourth upright disposed in a fourth slot adjacent to the slot containing the second upright, and further comprising an outer bridge connecting the third and fourth uprights and extending parallel with and spanning axially above the bridge of the lower conductors. The third upright is located a radial distance from the central axis equal to that of the first upright and the fourth upright is located a second radial distance from the central axis equal to that of the second upright, such that each of the outer bridges steps radially outward from the third upright to the fourth upright such that the outer bridges nest radially next to one another without crossing over one another.

In this third embodiment, a first end of the outer bridge has a first end connected with a radially inner portion of the respective third upright to define a radially outward-facing ledge at a junction between the first end and the third upright, and a second end of the outer bridge is connected with a radially outer portion of the respective fourth upright to define a radially inward-facing ledge at a junction between the second end and the fourth upright. The outer bridge disposed radially outward of the first outer bridge passes over the outward-facing ledge, and the outer bridge disposed radially inward of the first outer bridge passes over the inward-facing ledge. This allows a very compact and efficient layout of the end-turns, and may be fabricated by an additive manufacturing process.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
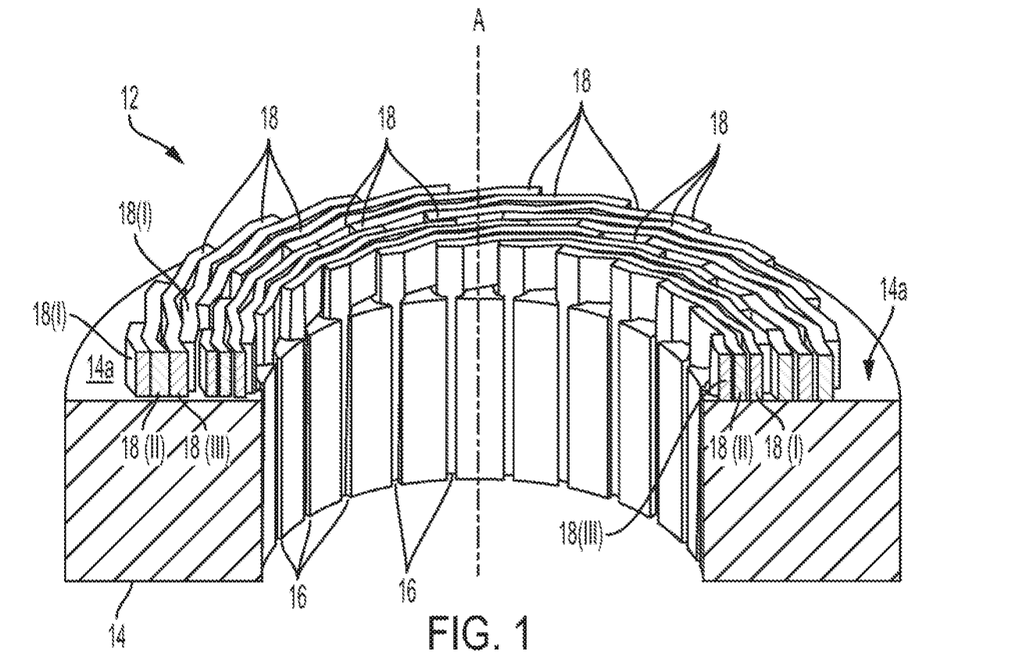
FIG. 1 is a perspective cross-sectional view of a portion of a stator of an electric machine.

FIG. 1 shows the upper portion of a stator 12 of an electric machine. Stator 12 comprises a core 14 having a plurality of circumferentially-spaced and axially-extending slots 16 defined therein. Central axis A indicates the axis of radial symmetry of core 14, and is also the axis-of-rotation of a generally cylindrical rotor (not shown) that, in an assembled electric machine, is supported within the stator for rotation. Core 14 is formed of a ferrous material such as iron or steel.

Stator 12 further comprises a plurality of windings or conductors 18 that are disposed in slots 16 and extend along a top axial end-surface 14a of core 14 and a bottom end-surface (not visible is FIG. 1) of the core, as is conventionally known. As used herein, the terms "top," "bottom," "upper," "lower," and similar terms refer only to the orientation of the stator as depicted in these drawings, and it is understood that an electric machine can be operated in any orientation.

Figure 2:
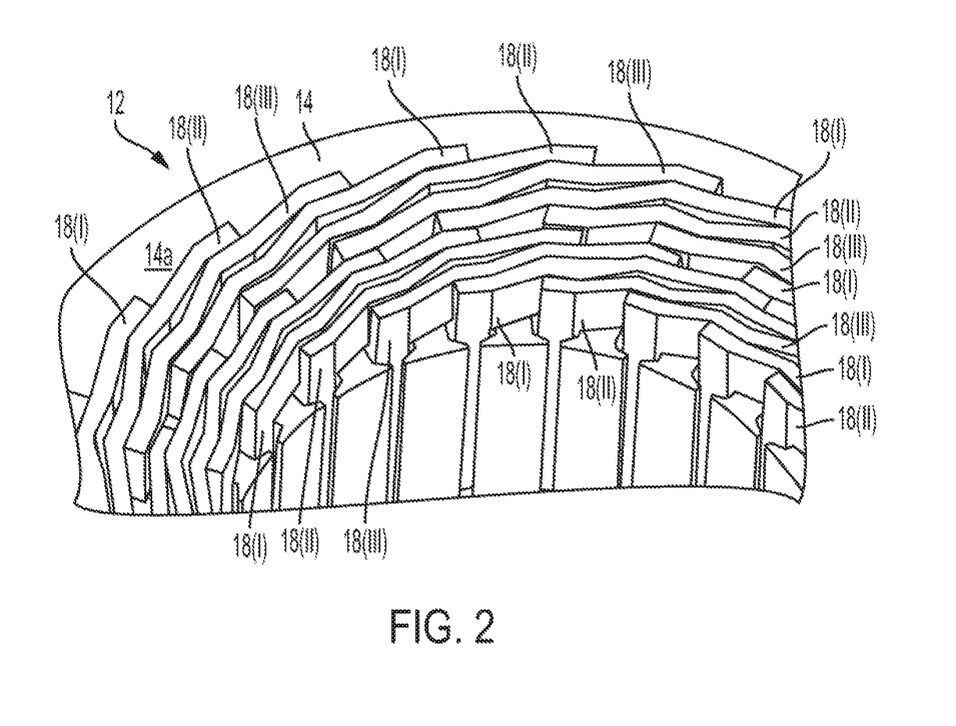
FIG. 2 is a perspective view showing a portion of a top axial end of the stator shown in FIG. 1.

Stator 12 is depicted as a three-phase device with four conductors-per-slot, but this is only by way of example as the inventive concepts disclosed herein may be employed in an electrical device having any number of phases and conductors-per-slot. In FIG. 2, the Roman numerals I, II and III indicate the electrical phase of each conductor 18.

Conductors 18 are formed of material high in electrical conductivity (such as copper) and are covered by a non-conductive coating so as to be electrically insulated from one another and from core 14. Because the insulating coating is very thin relative to the size of the conductors it is not shown in the figures or identified by a reference number.

Figure 3:
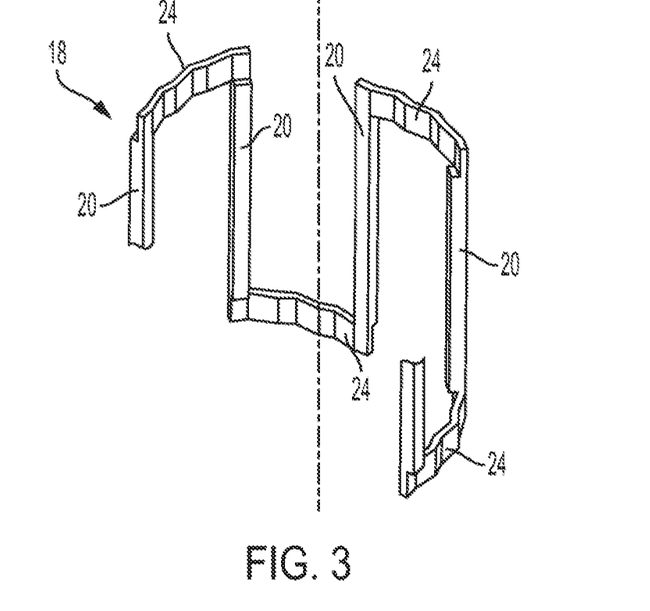
FIG. 3 is a partial perspective view of a representative one of the conductors of FIGS. 1 and 2 in isolation from the core and other conductors.

FIG. 3 depicts a portion of a representative conductor 18 in isolation from other components of stator 12. Each conductor 18 is a continuous element comprising axially-extending portions 20 disposed in the slots and bridge portions 24 (sometimes referred to by persons of skill in the art as end-turns) connecting the in-slot portions. Bridges 24 extend generally circumferentially over the core end-surfaces (as shown in FIGS. 1 and 2) to create the circuit paths required for functioning of an electric machine.

As is described in further detail below, the plurality of conductors 18 may advantageously be formed using additive manufacturing process (also known as three-dimensional printing) wherein stratified layers of material are deposited in sequence on top of one another. In such a process, the conductors 18 may be printed simultaneously with one another and with core 14. An insulating layer (not shown) surrounding the conductors 18 may also be formed simultaneously by such a process. If the insulating layer between the conductor and the core is also printed at the same time, it is possible to completely fill the available space in each slot so a void-free machine can be created. As an alternative, the conductors may be manufactured separately from the core and in two stages, wherein the second endturn is printed after the rest of the winding has been inserted in the core, or joined to the rest of the winding with a method not covered here.

Figure 4:
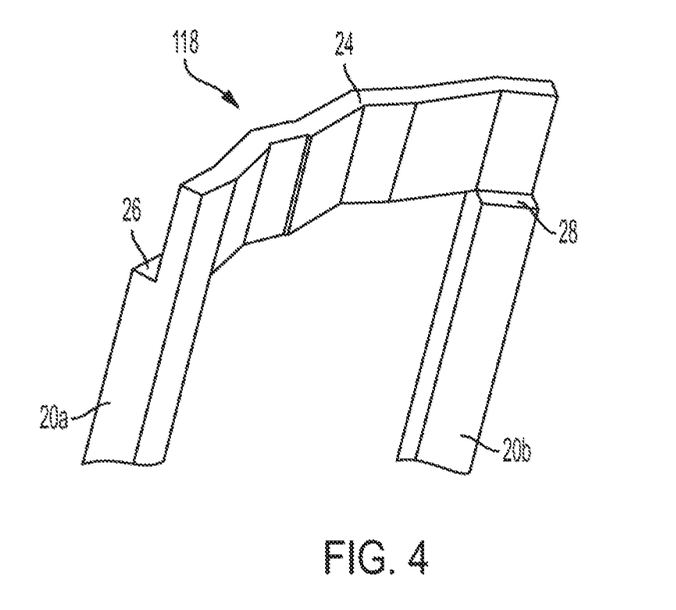
FIG. 4 is an enlarged view of a hurdle-shaped section of a representative one of the conductors shown in FIGS. 1-3.

For purposes only of further description, each conductor 18 depicted in FIG. 3 may be said to be composed of a co-joined series of hurdle-shaped conductors 118, one of which is depicted in isolation in FIG. 4. Each hurdle-shaped conductor 118 comprises a first upright 20a, a second upright 20b, and a bridge 24 extending between, connecting, and formed integrally with the uprights. Uprights 20a, 20b are each disposed in a different one of the slots 16, the respective slots separated by one or more intervening slots which are spanned by bridge 24. The number of intervening slots spanned by bridge 24 is dictated by several design features of the electrical machine (the number of electrical phases and the number of slots-per-pole, for example). In the depicted embodiment showing a three-phase, three slots-per-pole stator, wherein each bridge 24 spans two intervening slots.

As best seen in FIG. 2, first upright 20a is located radially closer to the central axis A than the second upright 20b, and bridge 24 steps radially outward as it extends from the first (relatively more inboard) upright to the second (relatively more outboard) upright. In the depicted embodiment, bridges 24 step radially outward as they extend clockwise over end surface 24a. The outward step of the bridges may, however, be in the counter-clockwise direction as dictated by the desired rotation direction of the motor.

A first end of bridge 24 is connected to a radially inner portion of first upright 20a such that the junction between the bridge and the first upright is configured to define a radially outward-facing ledge 26 (see FIG. 4), and a second end of the bridge is connected to a radially outer portion of the second upright 20b such that the junction between the bridge and the second upright is configured to define a radially inward-facing ledge 28.

In the embodiment depicted in FIG. 4, outward-facing ledge 26 and inward-facing ledge 28 are configured as right-angled surface. That is, the ledges 26, 28 are substantially perpendicular to the longitudinal axes of uprights 20a, 20b and substantially parallel with a plane perpendicular to axis A when the uprights 20a, 20b are disposed in their respective slots 16. In the alternative embodiment shown of FIG. 5, an inward-facing ledge 28' (and similarly, the outward-facing ledge, not shown, at the other end of bridge 24') may be inclined or sloped with respect to end-surface 14a to form a gradual transition in cross-sections at the junctions between the uprights and the bridge.

Among the advantages of forming the conductors 18 simultaneously with core 14 by a 3D-printing process is that the conductors may completely (or nearly completely) fill the cross-sectional area of their respective slots, thereby producing a very compact and efficient (due to reduced resistance) electrical machine. 3D printing also enables economical manufacture of conductors having gradual transitions in cross-sectional area and bend geometries, which are intended to avoid "bottlenecks" that may impede flow of electric current through the conductors.

Figure 5:
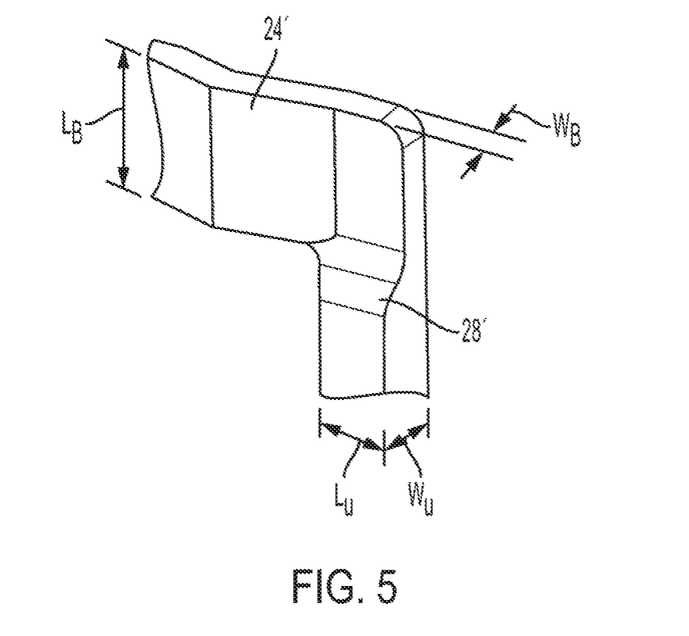
FIG. 5 is a further enlarged view of a portion of another embodiment of a hurdle-shaped section of a conductor.

The uprights 20a, 20b (that is, the in-slot portions) of all conductors preferably are of equal and uniform cross-sectional area. Said cross-sectional area is shown in FIG. 5 to be $W_u \times L_u$, assuming that the conductor is approximately rectangular in cross-sectional shape. Also, the cross-sectional area of the bridges 24 is preferably equal to or greater to that of the uprights. This may be achieved, as best seen in FIG. 5, if a bridge width $W_B$ and bridge length $L_B$ are selected such that $W_B$ is approximately equal to $\frac{1}{2} W_U$ and $L_B$ is approximately equal to $2 W_U$. In this way, the cross-sectional area perpendicular to the current flow through the conductor remains relatively constant throughout the length of the conductor.

Figure 6:
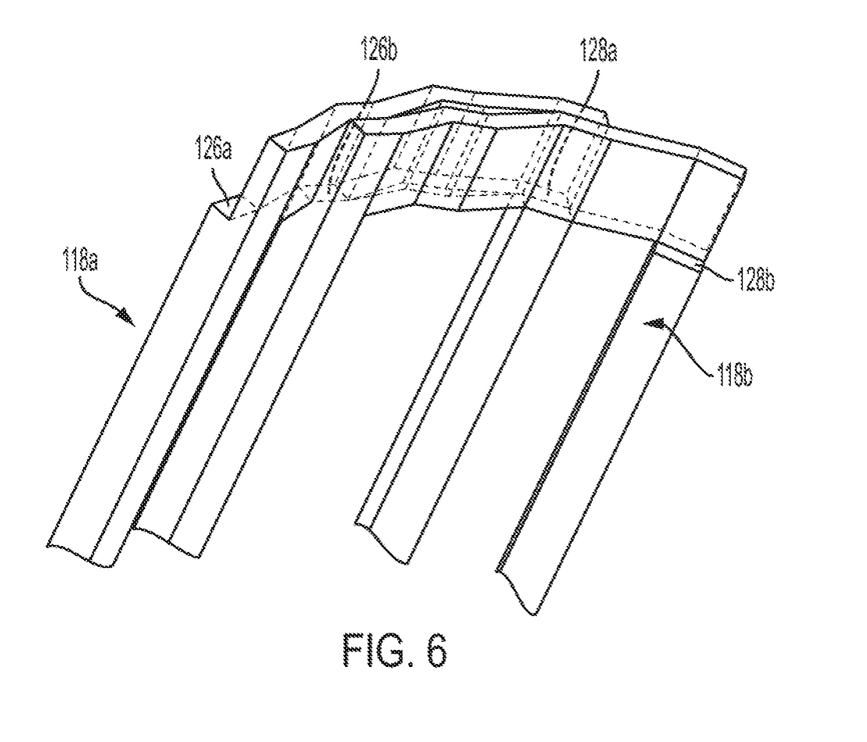
FIG. 6 is a perspective view of two radially adjacent conductors shown in FIGS. 1-3, in isolation from the core and other conductors.

Referring again to FIGS. 1 and 2, it is apparent that radially adjacent bridges 24 of each conductor 18 lay or "nest" against one another in the radial direction and do not cross over (overlap axially) one another. This nested relationship between radially-adjacent conductors will now be described with reference to FIG. 6, in which two conductors 118a, 118b are shown in isolation from the rest of the stator components. The two conductors shown may represent any pair of radially-adjacent conductors which compose stator 12. As shown, the following relationships exist: 1) The bridge of a radially outer conductor 118a lies in and passes over the outward-facing ledge of a radially inner conductor 118b; and 2) The bridge of the radially inner conductor 118b passes over and lies in the inward-facing ledge of the radially outer conductor 118a (which is disposed immediately adjacent conductor 118a). As this closely-nested relationship between each pair of radially-adjacent conductors 118a, 118b is repeated around the circumference and across the radius of stator 12, there is no requirement for the bridge of any conductor to cross axially over the bridge of a radially-adjacent conductor.

As compared with a conventionally-known stator in which the bridges of conductors cross over (overlap) one another, the disclosed configuration allows for conductors to be shorter in total length and therefore use less material and produce less electrical resistance. Further, the disclosed stator 12 (and hence the electrical machine overall) may be more axially compact than is known in the prior art.

Figure 7:
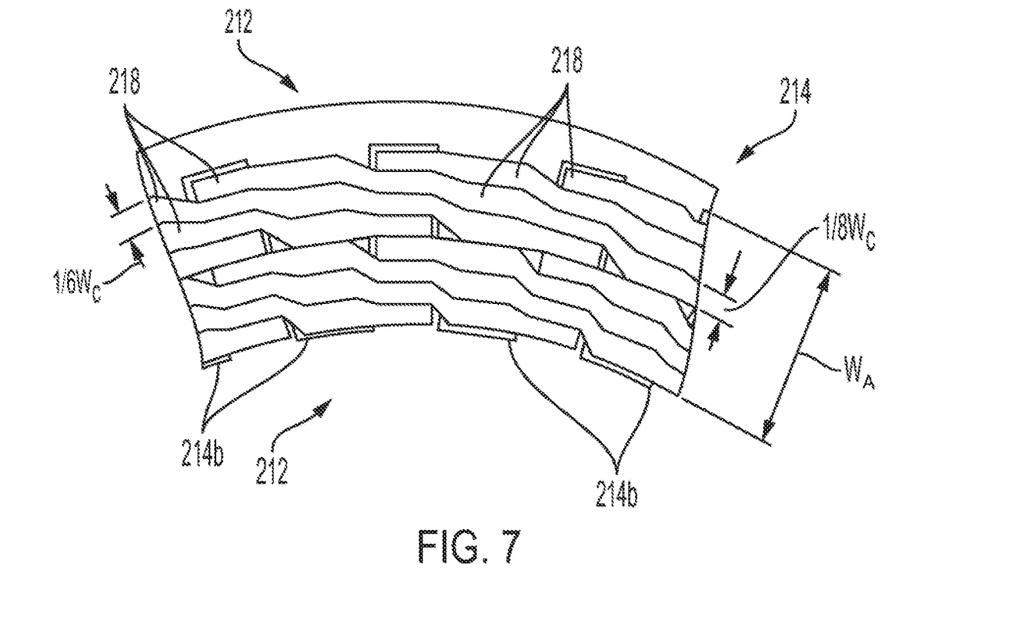
FIG. 7 is a top/planar view of a portion of a second disclosed embodiment of a stator.
Figure 8:
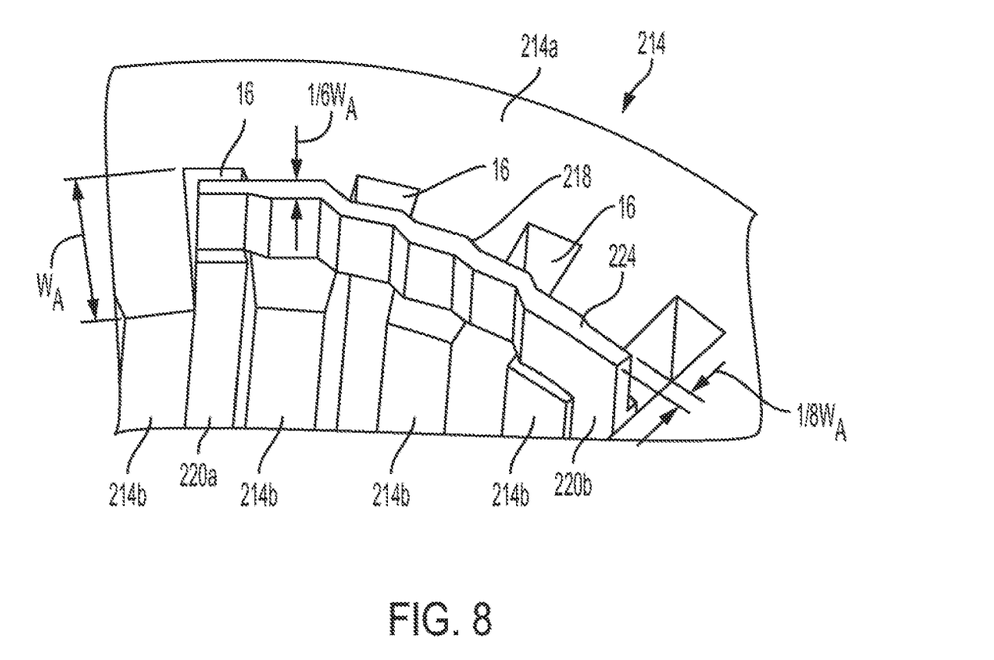
FIG. 8 is a schematic perspective view of the core and one hurdle-shaped conductor of the stator shown in FIG. 7.

FIGS. 7 and 8 show pertinent portions of a second embodiment of a stator 212 which differs from the above-described first embodiment in that conductors 218 comprise bridges 224 (only one of which is shown in FIG. 8 for clarity) that vary in width along their respective circumferential lengths/spans. Specifically, the portions of bridge 224 passing over (directly axially above) the teeth 214b separating slots 16 are greater in radial width than the adjacent portions of the bridge passing over the slots 16. This increase in radial width is possible because, as best seen in FIG. 7, only six bridges pass over each tooth 214b while eight conductors pass over each slot 16. Consequently, the maximum width of the over-tooth portions 224a of the bridge is ⅛ of the available slot width $W_A$, and the maximum width of the over-slot portions 224b is ⅙ of the slot width $W_A$. Adapting the width of the bridge portions 224a, 224b to fill all available radial space yields bridges having the minimum amount of electrical resistance for a given axial length. This varying of the radial widths of the bridges is also enabled by a 3D printing process.

It should also be noted that the position of upright 220b is relatively more radially inward in comparison to upright 220a. Consequently bridge 224 steps radially outward as it extends counter-clockwise (the opposite direction from that depicted in the previous embodiment) between upright 220b and 220a.

Figure 9A:
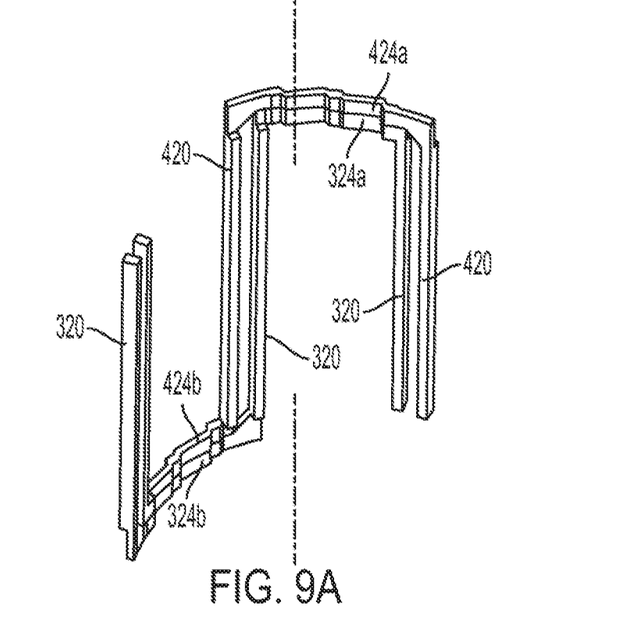
FIG. 9A is a perspective view of portions of a conductor of a third disclosed embodiment of a stator, in isolation from all other stator components.
Figure 9B:
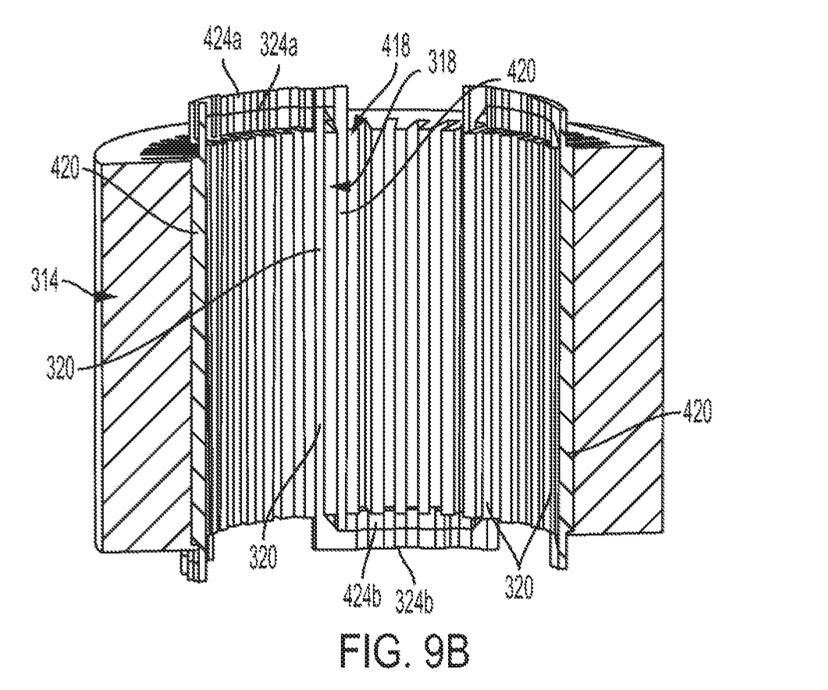
FIG. 9B is a perspective cross-sectional view of the core of the stator shown in FIG. 9A with portions of the conductor.
Figure 10:
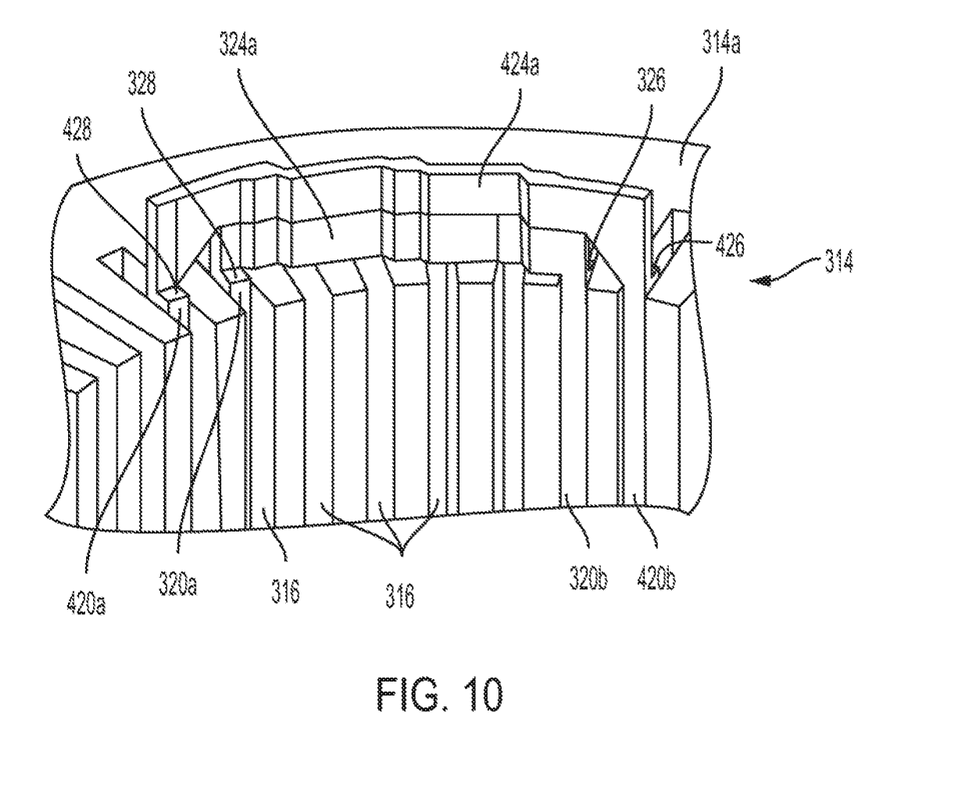
FIG. 10 is an enlarged perspective view of the inner and outer hurdle-shaped conductors shown in FIGS. 9A and 9B.

FIGS. 9-10 show a third embodiment of a three-phase stator having six slots-per-pole (two slots-per-pole for each phase). In this design the number of bridges that must span the intervening slots is twice that of the three slots-per-pole stator design in the first and second embodiments described above. The approach utilized in those embodiments would result in the bridges being very thin (radially) in order to fit twice as many bridges into a stator having the same radial dimension, and therefore very tall (axially) in order to maintain the same conductor cross-sectional area so that the electrical resistance of the conductor is not increased.

Instead, in the third embodiment the bridges of conductors that constitute each phase are arranged in two layers: a inner bridge immediately adjacent to the end surface of the core (substantially similar to the previously described bridges) and a second, outer bridge spanning over and passing axially above the inner bridge.

FIGS. 9A-9B show a stator core 314 along with two portions of a conductor belonging to a common electrical phase of the machine. For purposes of description, the conductor comprises a first portion 318 and a second portion 418, both of which pass axially back-and-forth through. First portion 318 comprises multiple axially-extending in-slot portions 320 connected by bridges 324a-c. Second portion 418 comprises multiple axially-extending in-slot portions 420 connected by bridges 424a-c.

Referring now to FIG. 10, each conductor 318, 418 is, for purposes only of further description, said to be composed of a co-joined series of hurdle-shaped elements, each element further comprising two uprights 320a-b, 420a-b disposed in slots defined by the core 314 and bridges 324a-b extending between, connecting, and formed integrally with the respective uprights (similar to the description above of FIG. 4). For purposes of description, first bridge 324a will hereafter be referred to the inner bridge, and second bridge 424a will hereafter be referred to as the outer bridge.

Inner bridge 324a is configured substantially similar to the bridge 224 shown in FIG. 8, except that it spans four intervening slots (in this example of a three-phase six slots-per-pole machine).

Outer bridge 424a spans six intervening slots and extends immediately axially above and parallel with inner bridge 324a. Uprights 420a-b are disposed in slots immediately adjacent to and circumferentially outboard (relative to inner bridge 324a) of the slots containing uprights 320a-b. The junctions between uprights 420a-b and the ends of outer bridge 424a form inward-facing and outward-facing ledges 428, 426 located at the same axial position as the corresponding ledges 328,326 of the inner bridge 324a. This configuration allows a radially nesting of adjacent bridges, substantially identical to that described in relation to the single-layer bridges of the previous two embodiments. In this third embodiment, the bridges of the lower layer nest radially against one another, and the bridges of the upper layer nest radially against one another directly above those of the lower layer.

As seen in FIG. 9, conductor 420 comprises the outer bridge 424a at the upper axial end (as viewed in the present figures) of core 314 and the inner bridge 424b at the opposite lower axial end. Likewise, conductor 320 comprises the inner bridge 324a at the upper axial end of core 314 and the outer bridge 324b at the opposite lower axial end. This is necessary due to the continuous nature of the conductors as they snake axially back and forth through the stator, and it results in all conductor paths having the same total length.

The disclosed design concepts utilize the flexibility of additive manufacturing to realize electric machine windings that are more compact without performance penalty. This is achieved by varying the conductor cross section shape in different parts of the machine, namely between the axial, in-slot portion and in the endturn or bridge portion, eliminating voids and wasted space and reducing the overall length of the conduction path.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. An electric machine comprising:
stratified layers arranged to form
a core defining a plurality of slots extending parallel to a central axis of the core and separated by teeth, and
a plurality of hurdle-shaped conductors each comprising first and second uprights disposed in a different one of the slots, wherein the first upright is radially closer to the central axis than the second upright, and further comprising a bridge connecting the uprights and extending circumferentially over an end surface of the core, wherein each of the bridges steps radially outward from the first upright to the second upright and radially adjacent bridges nest next to one another without crossing over one another, wherein the first and second uprights have equal cross-sectional areas, and a cross-sectional area of the bridge is nowhere less than the cross-sectional area of the first and second uprights, and wherein the bridge is half as wide and twice as tall as the uprights.

2. The electric machine of claim 1 wherein:
the bridge of a first of the conductors has a first end connected with a radially inner portion of the respective first upright to define a radially outward-facing ledge at a junction between the first end and the first upright, and a second end connected with a radially outer portion of the respective second upright to define a radially inward-facing ledge at a junction between the second end and the second upright;
the bridge of a second of the conductors located radially outward of the first conductor passes over the outward-facing ledge; and
the bridge of a third of the conductors disposed radially inward of the first bridge passes over the inward-facing ledge.

3. The electric machine of claim 2, wherein at least one of the inward-facing and outward-facing ledges are slanted with respect to a plane of the core end surface to provide a gradual change in cross-sectional area where bridge is connected to the respective ledge.

4. The electric machine of claim 1, wherein a section of a one of the bridges passing over an intermediate slot between the slots containing the uprights is radially thinner than a section of the bridge passing over a tooth immediately adjacent to the intermediate slot.

5. The electric machine of claim 1, wherein the stratified layers are further arranged to form:
a plurality of hurdle-shaped outer conductors each comprising a third upright disposed in a third of the slots adjacent to the slot containing the first upright of a one of the conductors, a fourth upright disposed in a fourth of the slots adjacent to the slot containing the second upright of the one of the conductors, wherein the third upright is located a radial distance from the central axis equal to that of the first upright and the fourth upright is located a second radial distance from the central axis equal to that of the second upright, and further comprising an outer bridge connecting the third and fourth uprights and extending parallel with and spanning the bridge of the one of the conductors, wherein each of the outer bridges steps radially outward from the third upright to the fourth upright such that the outer bridges nest radially next to one another without crossing over one another.

6. The electric machine of claim 5 wherein:
the outer bridge of a first of the outer conductors has a first end connected with a radially inner portion of the respective third upright to define a radially outward-facing ledge at a junction between the first end and the third upright, and a second end connected with a radially outer portion of the respective fourth upright to define a radially inward-facing ledge at a junction between the second end and the fourth upright;
the outer bridge of a second of the outer conductors located radially outward of the first outer bridge passes over the outward-facing ledge; and
the outer bridge of a third of the outer conductors disposed radially inward of the first outer bridge passes over the inward-facing ledge.

7. An electric machine comprising stratified layers arranged to form:
a core defining a plurality of slots extending parallel to a central axis of the core and separated by teeth, and a plurality of hurdle-shaped conductors each comprising first and second uprights disposed in respective first and second slots of the plurality, wherein the first upright is radially closer to the central axis than the second upright, and further comprising a bridge having a first end connected with a radially inner portion of the respective first upright to define a radially outward-facing ledge at a junction between the first end and the first upright, and a second end connected with a radially outer portion of the respective second upright to define a radially inward-facing ledge at a junction between the second end and the second upright, wherein each of the bridges extends circumferentially over an end surface of the core and steps radially outward from the first upright to the second upright, and wherein radially adjacent bridges nest next to one another without crossing over one another, each bridge passing over the outward-facing ledge of its radially inwardly adjacent conductor and passing over the inward-facing ledge of its radially outward adjacent conductor.

8. The electric machine of claim 7, wherein a section of a one of the bridges passing over an intermediate slot between the slots containing the first and second uprights is radially thinner than a section of the bridge passing over a tooth immediately adjacent to the intermediate slot.

9. The electric machine of claim 7, wherein at least one of the inward-facing and outward-facing ledges are slanted with respect to a plane of the core end surface to provide a gradual change in cross-sectional area where bridge is connected to the respective ledge.

10. The electric machine of claim 7, wherein the first and second uprights have equal cross-sectional areas, and a cross-sectional area of the bridge is nowhere less than the cross-sectional area of the first and second uprights.

11. The electric machine of claim 10, wherein the bridge portion of the conductor has half the width and double the height of the uprights.

12. An electric machine comprising:
   stratified layers arranged to form
      a core defining a plurality of slots extending parallel to a central axis of the core and separated by teeth, and
      a plurality of hurdle-shaped conductors each comprising first and second uprights disposed in a different one of the slots, wherein the first upright is radially closer to the central axis than the second upright, and further comprising a bridge connecting the uprights and extending circumferentially over an end surface of the core, wherein each of the bridges steps radially outward from the first upright to the second upright and radially adjacent bridges nest next to one another without crossing over one another, and wherein a section of a one of the bridges passing over an intermediate slot between the two slots containing the uprights is radially thinner than a section of the one of the bridges passing over a tooth immediately adjacent to the intermediate slot.

13. The electric machine of claim 12 wherein:
the bridge of a first of the conductors has a first end connected with a radially inner portion of the respective first upright to define a radially outward-facing ledge at a junction between the first end and the first upright, and a second end connected with a radially outer portion of the respective second upright to define a radially inward-facing ledge at a junction between the second end and the second upright;
the bridge of a second of the conductors located radially outward of the first conductor passes over the outward-facing ledge; and
the bridge of a third of the conductors disposed radially inward of the first bridge passes over the inward-facing ledge.

14. The electric machine of claim 13, wherein at least one of the inward-facing and outward-facing ledges are slanted with respect to a plane of the core end surface to provide a gradual change in cross-sectional area where bridge is connected to the respective ledge.

15. The electric machine of claim 12, wherein the first and second uprights have equal cross-sectional areas, and a cross-sectional area of the bridge is nowhere less than the cross-sectional area of the first and second uprights.

16. The electric machine of claim 15, wherein the bridge portion of the conductor has half the width and double the height of the uprights.

* * * * *